(12) United States Patent
Otsuki et al.

(10) Patent No.: US 7,536,255 B2
(45) Date of Patent: May 19, 2009

(54) SENSOR OR NETWORKS WITH SERVER AND INFORMATION PROCESSING SYSTEM, METHOD AND PROGRAM

(75) Inventors: Yoshiyuki Otsuki, Kyoto (JP); Shunji Ota, Kyoto (JP); Masayuki Oyagi, Kyoto (JP); Masaki Yamato, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 1056 days.

(21) Appl. No.: 10/492,406

(22) PCT Filed: Oct. 7, 2002

(86) PCT No.: PCT/JP02/10421

§ 371 (c)(1),
(2), (4) Date: Apr. 12, 2004

(87) PCT Pub. No.: WO03/034367

PCT Pub. Date: Apr. 24, 2003

(65) Prior Publication Data

US 2004/0249563 A1      Dec. 9, 2004

(30) Foreign Application Priority Data

Oct. 12, 2001    (JP)    ............................. 2001-315277

(51) Int. Cl.
*G01C 21/00*    (2006.01)

(52) U.S. Cl. ........................ 701/200; 701/207; 700/213; 700/214; 700/215; 700/221; 700/225; 700/226; 700/229; 340/572; 340/517; 340/568.1; 340/568.2; 340/673; 340/3.1; 340/505; 340/5.92; 235/375; 235/385; 709/208; 709/224; 709/220; 709/223

(58) Field of Classification Search .................... 701/1, 701/200, 207; 700/213–215, 221, 225, 226, 700/229; 340/572, 517, 568.1, 568.2, 673, 340/3.1, 505, 5.92; 235/375, 385; 709/208, 709/224, 220, 223
See application file for complete search history.

(56) References Cited

U.S. PATENT DOCUMENTS 5,365,290 A * 11/1994 Suzuki et al. ................. 396/26
(Continued)

FOREIGN PATENT DOCUMENTS

CN    1188267 A    7/1998
(Continued)

OTHER PUBLICATIONS

Kohno et al., "Components of an Adaptive Sensor Network," Electronics and Communications in Japan, Part 3, vol. 84, No. 3, 2001, Translated from Denshi Joho Tsuhim Gakkai Ronbunshi, vol. J82-A, No. 3, Mar. 1999, pp. 454-462.

(Continued)

*Primary Examiner*—Khoi Tran
*Assistant Examiner*—Jorge O Peche
(74) *Attorney, Agent, or Firm*—Foley & Lardner LLP

(57) ABSTRACT

An information processing device (central apparatus (2)) in a sensor network system is arranged so as to include an input-output processing section (101); an information converting section (103) and a resource specification information recognizing section (104) for dividing target information which is requested with the information request signal into a combination of information elements which appropriately compose the target information; a data acquiring section (107) for acquiring data of sensing results; and an input-output processing section (101) for outputting information based on the data acquired by said data acquiring section.

18 Claims, 9 Drawing Sheets

U.S. PATENT DOCUMENTS

| | | | | |
|---|---|---|---|---|
| 5,412,421 | A | * | 5/1995 | Hale et al. ............. 348/208.14 |
| 5,451,960 | A | * | 9/1995 | Kastella et al. ................ 342/59 |
| 5,485,263 | A | * | 1/1996 | Bjorner et al. ............. 356/4.01 |
| 5,563,988 | A | * | 10/1996 | Maes et al. .................. 345/421 |
| 5,636,122 | A | * | 6/1997 | Shah et al. .................. 701/207 |
| 5,644,386 | A | * | 7/1997 | Jenkins et al. ............. 356/4.01 |
| 5,810,014 | A | * | 9/1998 | Davis et al. ................. 600/508 |
| 5,921,937 | A | * | 7/1999 | Davis et al. ................. 600/508 |
| 5,959,529 | A | * | 9/1999 | Kail, IV ................ 340/539.12 |
| 5,959,568 | A | * | 9/1999 | Woolley ...................... 342/42 |
| 6,006,159 | A | * | 12/1999 | Schmier et al. ............. 701/200 |
| 6,085,336 | A | * | 7/2000 | Swoboda et al. .............. 714/30 |
| 6,144,993 | A | * | 11/2000 | Fukunaga et al. .......... 709/208 |
| 6,181,994 | B1 | * | 1/2001 | Colson et al. .................. 701/33 |
| 6,208,386 | B1 | * | 3/2001 | Wilf et al. ................... 348/578 |
| 6,225,901 | B1 | * | 5/2001 | Kail, IV ................ 340/539.11 |
| 6,600,418 | B2 | * | 7/2003 | Francis et al. ............ 340/572.1 |
| 6,611,755 | B1 | * | 8/2003 | Coffee et al. ................ 701/213 |
| 6,735,630 | B1 | * | 5/2004 | Gelvin et al. ............... 709/224 |
| 6,804,578 | B1 | * | 10/2004 | Ghaffari ..................... 700/229 |
| 6,832,251 | B1 | * | 12/2004 | Gelvin et al. ............... 709/224 |
| 6,859,831 | B1 | * | 2/2005 | Gelvin et al. ............... 709/224 |
| 7,020,701 | B1 | * | 3/2006 | Gelvin et al. ............... 709/224 |
| 2002/0111822 | A1 | * | 8/2002 | Shimizu et al. ................ 705/1 |
| 2005/0060069 | A1 | * | 3/2005 | Breed et al. ................... 701/29 |

FOREIGN PATENT DOCUMENTS

| | | | | |
|---|---|---|---|---|
| JP | 2-096236 | | | 4/1990 |
| JP | 7-160514 | | | 6/1995 |
| JP | 11-025389 | | | 1/1999 |
| JP | 11-065434 | | | 3/1999 |
| JP | 11-265400 | | | 9/1999 |
| JP | 2000-020556 | | | 1/2000 |
| JP | 2000-20556 | A | | 1/2000 |
| JP | 2000-258174 | | | 9/2000 |
| JP | 2000-258174 | A | | 9/2000 |
| JP | 2000-295375 | | | 10/2000 |
| JP | 2000-295375 | A | | 10/2000 |
| JP | 2001-194161 | | | 7/2001 |
| JP | 2001-338018 | | | 12/2001 |
| JP | 2002271522 | A | * | 9/2002 |
| JP | 2003060796 | A | * | 2/2003 |
| JP | 2003063356 | A | * | 3/2003 |
| JP | 2003110749 | A | * | 4/2003 |
| JP | 2003115092 | A | * | 4/2003 |
| JP | 2003115093 | A | * | 4/2003 |

OTHER PUBLICATIONS

Shiraishi et al., "Designing and Implementation of Sensor Data Agent for Sensor Network Application," Extended Abstracts of the 7th Workshop on Multi Agent and Cooperation Computation, Dec. 9, 1998, pp. 1-7.

Japanese Office Action with its English translation, Japanese Patent Application No. 2001-315277, 6 Sheets.

* cited by examiner

FIG. 9 (a)

| TARGET INFORMATION |
|---|
| A |
| ⋮ |

FIG. 9 (b)

| SENSING SIGNAL | | TARGET INFORMATION | DESTINATION ID |
|---|---|---|---|
| SENSOR | SENSING RESULT | | |
| S | SR | A | ID_0 |
| ⋮ | ⋮ | ⋮ | ⋮ |

FIG. 10

| TARGET INFORMATION | INFORMATION ELEMENT |
|---|---|
| A | A1+A2 |
| ⋮ | ⋮ |

FIG. 11

| INFORMATION ELEMENT | RESOURCE SPECIFICATION INFORMATION | DATA MODIFICATION INFORMATION | COMMUNICATION INFORMATION |
|---|---|---|---|
| A1 | R1 | P1 | C1 |
| A2 | R2 | P2 | C2 |
| ⋮ | ⋮ | ⋮ | ⋮ |

FIG. 12

| SENSOR INFORMATION | SENSOR ID |
|---|---|
| SI | ID_S |
| ⋮ | ⋮ |

SENSOR OR NETWORKS WITH SERVER AND INFORMATION PROCESSING SYSTEM, METHOD AND PROGRAM

This application is a National Stage application of PCT/JP02/10421, filed Oct. 7, 2002, which claims priority from Japanese patent application 2001-315277, filed Oct. 12, 2001. The entire contents of each of the aforementioned applications are incorporated herein by reference.

TECHNICAL FIELD

The present invention relates to a sensor network system including a plurality of sensors and an information processing device collecting data of sensing results obtained by the plurality of sensors; the information processing device in the sensor network system; an information processing program; and a computer-readable storage medium containing the information processing program.

BACKGROUND ART

A huge variety of sensors have been used in large numbers in our everyday life for some time. They are specialized for particular purposes including detection of car thefts, house break-ins, and fires. These sensors typically make up sensor networks for individual purposes. We can use information from the sensor networks to fulfill the intended purposes.

At the same time, technology is under development to utilize information from a sensor network in application software on a computer outside the network. An example is found in a paper published on Dec. 9, 1998, "Designing and implementation of sensor data agent for sensor network application," by Shiraishi You & Anzai Yuichiro, Extended Abstracts (7th Workshop), MultiAgent and Cooperation Computation. The paper discloses a system called an "agent platform" capable of providing a flexible interface to applications utilizing the sensor network.

This system functions as an interface between a plurality of applications and a node manager managing nodes (sensor nodes) on the sensor network and providing information from the nodes. The use of such a system is intended to reduce communications between the applications and the node manager. Further, this system interprets an abstract task from the applications into a more definite message designating a node ID.

A sensor network is basically configured in accordance with a particular purpose, as described above, and sensors in the sensor network are equipped in order to sense an event in accordance with the purpose of the sensor network.

In some cases, the sensor network equipped with a variety of sensors in large numbers can obtain information other than information for the intended purpose by combining information from predetermined sensors in the sensor network. By obtaining information for a purpose different from the intended purpose as described above, it is possible to utilize the sensors effectively.

However, even though the technique disclosed in the paper may be employed to select one of the nodes in accordance with an abstract task and obtain information from the selected node, the abstract task is still a task for designating one of the nodes. Hence, the application or user is required to have knowledge of the nodes. This causes inconvenience when using the sensor network to obtain information having a purpose different from the intended purpose as described above.

In view of the foregoing problems, the present invention has an objective to provide a sensor network system capable of effectively utilizing a plurality of sensors included therein by using sensing results of the plurality of sensors to acquire a wide variety of information; an information processing device in the sensor network system; an information processing program; and a computer-readable storage medium containing the information processing program.

DISCLOSURE OF INVENTION

An information processing device of the present invention in a sensor network system including a plurality of sensors and the information processing device collecting data of sensing results obtained by the plurality of sensors is arranged so as to include a signal receiving section for receiving an information request signal with which information is requested from the information processing device; a converting section for dividing target information which is requested with the information request signal into a combination of information elements which appropriately compose the target information, and converting the information elements into resource specification information which specifies resources that can be information sources of the respective information elements; a data acquiring section for acquiring data of sensing results obtained by one or more of the plurality of sensors that are selected in accordance with the resource specification information; and an output section for outputting information based on the data acquired by the data acquiring section.

With this arrangement, the information request signal is supplied to the signal receiving section of the information processing device. The information request signal is used for requesting the information processing device to provide information, and sent from a user terminal device outside the sensor network system, for example.

The information request signal designates the target information which is requested with the signal. The converting section converts the target information into a combination of information elements which appropriately compose the target information, and converts the information elements into resource specification information which specifies resources that can be information sources of the respective information elements. In order to divide the target information into the combination of information elements, correspondence between expected target information and a combination of information elements, for example, may be pre-set and pre-stored as a table.

Next, the data acquiring section acquires data of sensing results obtained by one or more of the plurality of sensors that are selected in accordance with the resource specification information. Then, the output section outputs information based on the data acquired by the data acquiring section to the user terminal device which is the sender of the information request signal, for example.

With this arrangement, even if the sender of the information request signal does not know what type(s) of sensors the sensor network system includes, the sender can request the target information by means of a natural language, for example, and obtain either the target information or information close to the target information. This is because the converting section divides the target information into information elements which are information that can be acquired from sensing results of the sensors, and the data acquiring section acquires sensing results of one or more of the sensors corresponding to the information elements. In other words, sensor(s) in the sensor network system are dynamically selected in accordance with the target information.

With this, it is possible to obtain a wider variety of information from the sensor network system and effectively utilize sensors in the sensor network system for acquiring the various types of information.

An information processing device of the present invention in a sensor network system including a plurality of sensors and the information processing device collecting data of sensing results obtained by the plurality of sensors is arranged so as to include a sensing result receiving section for receiving data of a sensing result obtained by one of the plurality of sensors; a sensing result converting section for converting the data of the sensing result obtained by the one of the plurality of sensors into target information which is associated with the sensing result and which is required in response to the sensing result; a converting section for dividing the target information into a combination of information elements which appropriately compose the target information, and converting the information elements into resource specification information which specifies resources that can be information sources of the respective information elements; a data acquiring section for acquiring data of the information elements in accordance with the resource specification information; and an output section for outputting information based on the data acquired by the data acquiring section.

With this arrangement, the data of a sensing result of the sensor is supplied to the sensing result receiving section of the information processing device. The data of the sensing result is converted by the sensing result converting section into the target information which is required in response to the particular sensing result. Then, the converting section divides the target information into a combination of information elements which appropriately compose the target information, and converts the information elements into resource specification information which specifies resources that can be information sources of the respective information elements. In order to divide the target information into the combination of information elements, correspondence between likely target information and a combination of information elements, for example, may be pre-set and pre-stored as a table.

Then, the data acquiring section acquires data of sensing results in accordance with the resource specification information, and the output section outputs information based on the acquired data.

With this arrangement, in response to a particular sensing result obtained by a sensor, the information processing device can output and provide either the target information or information close to the target information required in accordance with the sensing result. In other words, it is possible to convert a sensing result of a sensor into another information relating to the sensing result and provide the converted information.

With this, it is possible to effectively utilize sensors in the sensor network system for obtaining various types of information.

For a fuller understanding of the nature and advantages of the invention, reference should be made to the ensuing detailed description taken in conjunction with the accompanying drawings.

BRIEF DESCRIPTION OF DRAWINGS

FIG. 4(a) is a conceptual illustration using the Internet as a communications network. FIG. 4(b) is a conceptual illustration using the Internet and a LAN connected to the Internet as a communications network. FIG. 4(c) is a conceptual illustration using a public network as a communications network.

FIGS. 9(a) and 9(b) are conceptual illustrations showing data arrangements of target information tables stored in the central apparatus shown in FIG. 1.

FIG. 10 is a conceptual illustration showing a data arrangement of a target information/information element conversion table stored in the central apparatus shown in FIG. 1.

FIG. 11 is a conceptual illustration showing a data arrangement of a resource specification information table stored in the central apparatus shown in FIG. 1.

FIG. 12 is a conceptual illustration showing a data arrangement of a resource information table stored in the central apparatus shown in FIG. 1.

BEST MODE FOR CARRYING OUT THE INVENTION

The following will explain an embodiment of the present invention with reference to FIGS. 1 through 12.

(Overall Structure)

A sensor network system in accordance with the present embodiment is made up of a sensor network of multiple sensors and a central apparatus managing the sensor network. The sensor network is capable of data communications with the central apparatus via a communications network. A concrete example of a system including the present sensor network system is shown in FIG. 2.

Figure 2:
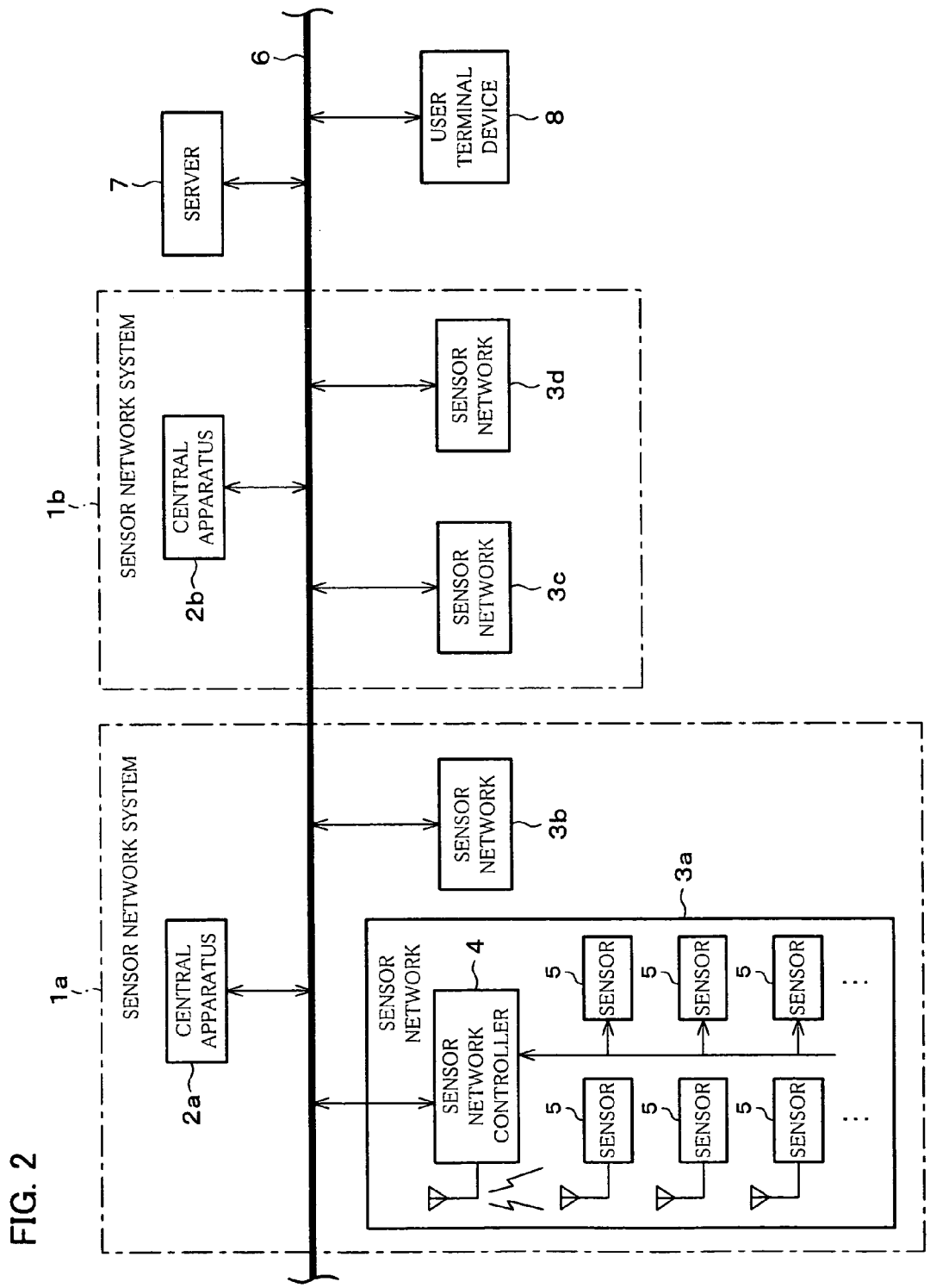
FIG. 2 is a block diagram illustrating the structure of a system including a sensor network system in accordance with an embodiment of the present invention.

FIG. 2 is a block diagram illustrating the structure of the system including the sensor network system in accordance with the present embodiment. Here, the system includes two sensor network systems 1a and 1b; a communications network 6 connected with central apparatus 2a and 2b and sensor networks 3a through 3d of the sensor network systems 1a and 1b; and a server 7 and a user terminal device 8 which are connected to the communications network 6.

The sensor network system 1a includes one central apparatus 2a and two sensor networks 3a and 3b. The sensor network system 1b includes one central apparatus 2b and two sensor networks 3c and 3d. In other words, the central apparatus 2a manages the sensor network 3a and 3b, and the central apparatus 2b manages the sensor networks 3c and 3d.

Hereinafter, the sensor network systems 1a and 1b will be collectively referred to as the "sensor network system 1" when it is not necessary to distinguish both the sensor network systems 1a and 1b from each other. Similarly, the sensor networks 3a through 3d will be collectively referred to as the "sensor network 3" when it is not necessary to distinguish the sensor networks 3a through 3d from one another.

Each sensor network 3 includes a sensor network controller (sensor network gateway) 4 and a plurality of sensors 5 capable of data communications with the sensor network controller 4.

Here, processes performed on the sensor network system 1 will be schematically explained. The sensor network system 1 performs processes in accordance with an information request from the user terminal 8 or detection of a particular state at a sensor 5.

First, the process in accordance with the information request from the user terminal device 8 will be explained. Using the user terminal device 8, the user of the user terminal device 8 requests information from a central apparatus 2, i.e., the central apparatus 2a, for example. The central apparatus 2a interprets the request from the user terminal device 8, so as to recognize information (target information) requested by the user and recognize information (information elements) composing the target information. The central apparatus 2a acquires information elements from the sensor networks 3a and 3b in the sensor network system 1a, the sensor networks 3c and 3d in the other sensor network system 1b, and the external server 7. The central apparatus 2a composes the target information from either an obtained information element individually or obtained information elements in combination, and sends the target information to the user terminal device 8. With this, the user obtains from the central apparatus 2a, either the target information or information close to the target information.

Next, the process in accordance with the detection of a particular state at a sensor 5 will be explained. If the sensor 5 in the sensor network system 1a senses a particular state, for example, the central apparatus 2a recognizes via the sensor network controller 4 that the sensor 5 sensed the particular state. The central apparatus 2a then recognizes information (target information) required when the sensor 5 senses the particular state, and a destination to which the target information is to be output, and recognizes information (information elements) composing the target information. Further, in a similar manner as described earlier, the central apparatus 2a acquires information elements from the sensor networks 3a and 3b in the sensor network system 1a, the sensor networks 3c and 3d in the other sensor network system 1b, and the external server 7. The central apparatus 2a then composes the target information from either an obtained information element individually or obtained information elements in combination, and sends the target information to the destination (user terminal device 8, for example) in a similar manner as described earlier. With this, the target information can be sent to the predetermined destination when the sensor 5 senses a particular state.

Before more concretely explaining the processes performed on the sensor network system 1, the following will explain the system shown in FIG. 2 in more detail.

First, a data communications scheme between the sensor network controller 4 and the sensors 5 will be explained. The sensor network controller 4 and sensors 5 are equipped with respective communications devices. The communications device in the sensor network controller 4 is the host, whereas the communications devices in the sensors 5 are the terminals. The host and terminals communicates data with each other.

The data communications between the host and terminals may be wired or wireless. Some examples for the latter utilize a short-distance wireless system based on weak radio waves as in wireless LAN (Local Area Network) standards and Bluetooth (registered trademark) standards or a specified small power wireless system. Others utilize an optical wireless system or short-distance infrared communications system. Wired communications may be based on a LAN or utilize dedicated lines.

The communications between the host and terminals may be bidirectional or single-directional, depending on the type of the sensors 5. The communications are bidirectional if the sensors 5 are controlled by the sensor network controller 4 through control signals. Meanwhile, the communications are terminal-to-host single-directional if the sensors 5 send signals to the sensor network controller 4, with no signals traveling in the opposite direction.

In the sensor 5, the interface between a sensor section for sensing and the communications devices (terminals) can be, for example, RS-232C, RS-485, or DeviceNET. It is through this interface that the sensors 5 send sensing data indicating a result of sensing by the sensor sections to the sensor network controller 4. The sensor network controller 4 receives sensing data from the sensors 5, subject the sensing data to a process (detailed later), and feeds the central apparatus 2 with information based the processed data.

The data communications between the sensors 5 and the sensor network controller 4 may be nonprocedural. When this is the case, the sensors 5 may send the sensing data to the sensor network controller 4 by means of analog current or voltage. The sensor network controller 4 performs sampling, A/D conversion, and other required processes on the sensing data.

Next, the structure of the sensor network system 3 will be explained. The sensor network controller 4 typically manages multiple (a maximum of 256) sensors 5 constituting the sensor network 3 (e.g., about ten sensors 5 in a sensor network 3 for security management). Sensor networks 3 may overlap as shown in FIG. 3.

Figure 3:
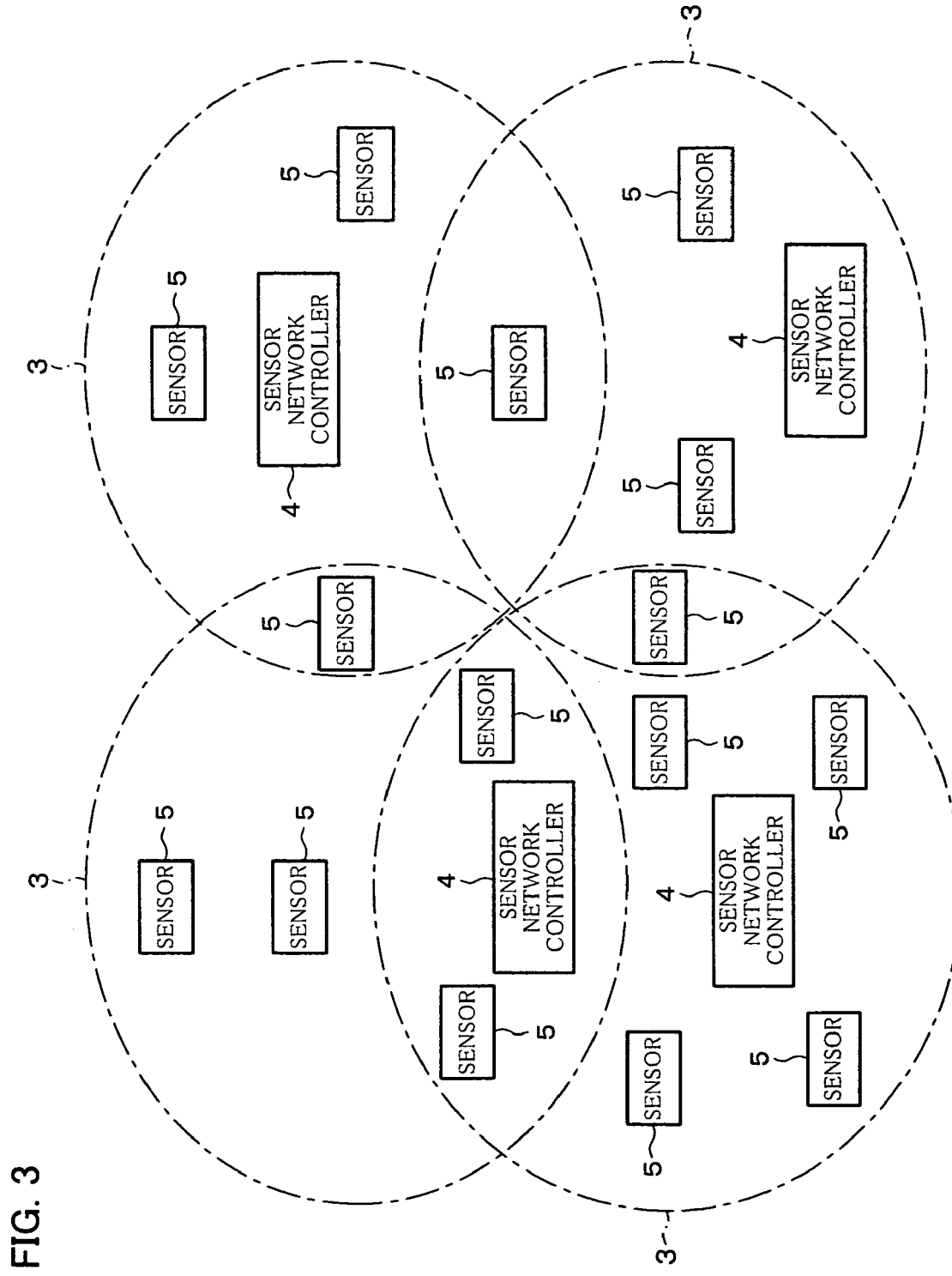
FIG. 3 is a conceptual illustration showing an example of overlapping sensor networks.

FIG. 3 is a conceptual illustration showing an example of overlapping sensor networks 3. In the example of FIG. 3, some sensors 5 belong to two or more sensor networks 3, and two sensor network controllers 4 belong to one sensor network 3. If a sensor 5 is managed by two or more sensor network controllers 4, the sensor 5 in question can keep operating normally following a breakdown or other failure of one of the sensor network controllers 4, thanks to the other sensor network controller(s) 4. Therefore, it is desirable if those sensors 5 with which a high level of reliability is required are managed by two or more sensor network controllers 4.

In the system shown in FIG. 2, each of the sensors 5 is assigned with a unique sensor ID, and identified by the unique sensor ID. In the system of FIG. 2, the request of the user can be more precisely met if a larger number of sensors 5 are used. To enable such a configuration, the sensor ID may be expressed using high bits (for example, 64 bits or greater). The sensor ID may be, for example, the IP address under TCP/IP (Transmission Control Protocol/Internet Protocol). To express the sensor ID using a high bit, the 128-bit IPv6 can be used.

The subsequent part of the description will describe a data communications scheme between the sensor network controller 4 and the central apparatus 2.

FIGS. 4(a) through 4(c) are conceptual illustrations showing examples of data communications schemes in the sensor network system 1 between the central apparatus 2 and the sensor network controller 4.

FIG. 4(a) shows a case where the Internet is used as the communications, network 6. The Internet may be relied on entirely for the link between the central apparatus 2 and the sensor network controller 4. Alternatively, the sensor network controller 4 may be connected to the Internet by, for example, wireless packet communications used in a packet-based mobile data communications service. A further alternative is to connect the central apparatus 2 to the Internet by a telephone or other public network. The "telephone network" here includes ISDN (Integrated Services Digital Network), PHS (registered trademark) (Personal Handyphone System) networks, and mobile phone networks.

Figure 4:
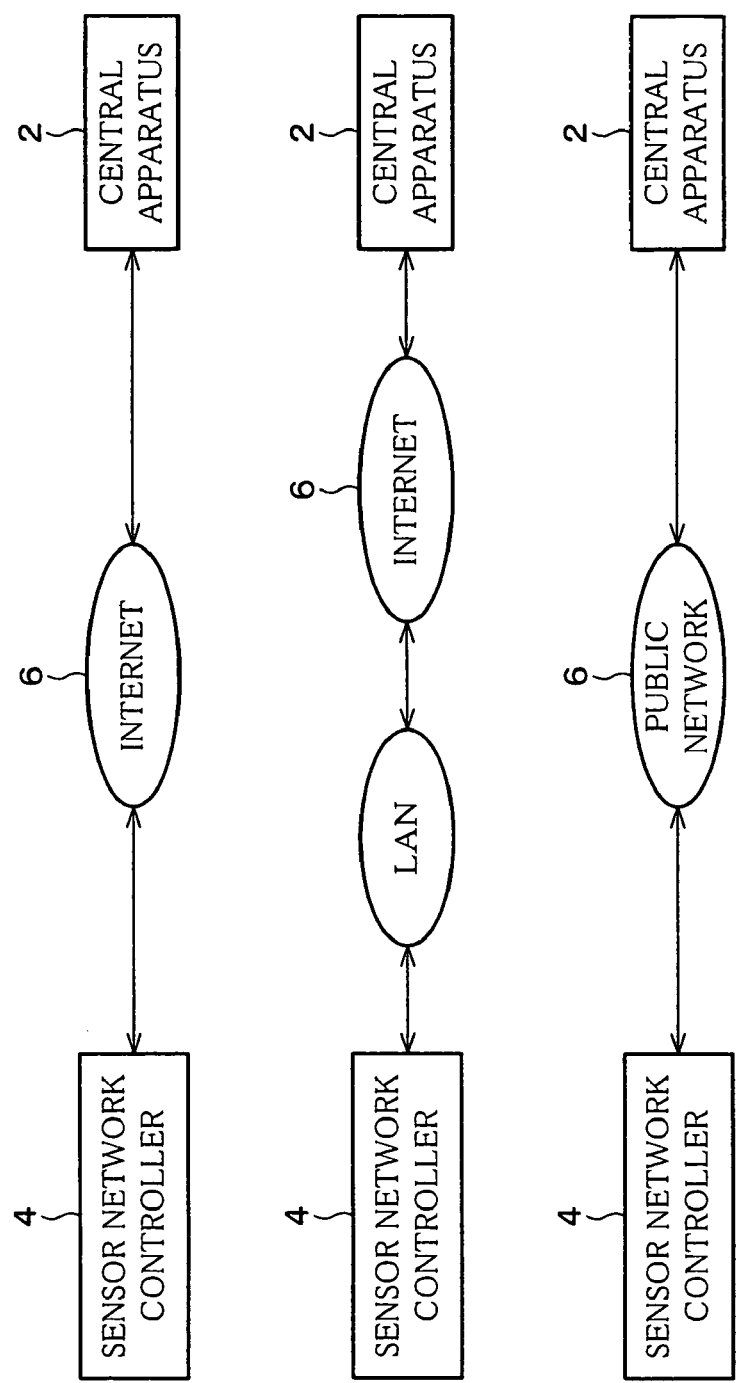
FIGS. 4(a) to 4(c) are conceptual illustrations showing examples of data communications schemes between a central apparatus and a sensor network controller in the sensor network system in FIG. 2.

FIG. 4(*b*) shows a case where the Internet and a LAN (Local Area Network) connected to the Internet are used as the communications network 6. In FIG. 4(*b*), a LAN intervenes between the Internet and the sensor network controller 4. The LAN may be, for example, an Ethernet (registered trademark) or wireless LAN. A LAN may intervene between the Internet and the central apparatus 2.

FIG. 4(*c*) shows a case where a public network is used as the communications network 6. The public network may be a telephone network (ISDN, PHS (registered trademark) network, mobile phone network, etc.).

The following description assumes that the Internet is used as the communications network 6 unless otherwise stated, that is, the configuration in FIG. 4(*a*).

Now, each constituent of the FIG. 2 system will be described in more detail.

(Sensor)

Various sensors are used as the sensors 5 on the sensor network 3. Examples follow.

Those detecting a human include photoelectric sensors, beam sensors, ultrasound sensors, and infrared sensors. Those detecting a movement or destruction of an object include vibration sensors and acceleration sensors (3D sensors, ball semiconductor sensors). Those detecting a sound include microphones, pitch sensors, and acoustic sensors. Those detecting video include video cameras. Those detecting fires include temperature sensors, smoke sensors, and humidity sensors. Those primarily mounted to vehicles include GPS (Global Positioning System) devices, acceleration sensors, wiper ON/OFF sensors, vibration sensors, and tilt sensors. Those installed indoors include light ON/OFF sensors and water leak sensors. Those installed outdoors include rain gauges, wind gauges, and thermometers. There are various other sensors: namely, capacitance level sensors, capacitive intrusion sensors, electric current sensors, voltage sensors, door opening/closure detecting reed switches, and time detecting clocks.

As discussed in the foregoing, the sensors 5 on the sensor network 3 are not limited to devices generally called "sensors." The sensors 5 may be any kind of device which detects an event and for example, converts a sensing result into an electric signal as sensing data for transfer to the sensor network controller 4.

The sensors 5 on the sensor network 3 may be active sensors. The active sensor refers to a device which, like a video camera, has zooming and autofocusing functions and a direction-changing function to change the shooting direction, as well as CCDs (Charge Coupled Devices) as a sensor section for performing sensing, and which automatically operates or is manipulated by the sensor network controller 4 through its control signal. Such active sensors are capable of relatively high precision sensing suitable to the events. For example, an "active" video camera, upon detection of a moving object (smoke, for example) in its shooting range, points itself at the object to shoot it more appropriately.

The sensors 5 on the sensor network 3 may be autonomous. The autonomous sensor here refers to a sensor which notifies the sensor network controller 4 and the central apparatus 2 of information on the sensor itself (sensor information), for example, periodically. The sensor information indicates, for example, the type (including its detection target) and layout (position, installation site) of the sensor.

In some cases, the sensors are attached to movable objects such as vehicles. When this actually happens, moving the sensors changes information obtained in accordance with sensing results of the sensors. For example, suppose that temperature sensor is installed on a vehicle to sense the temperature. If the vehicle is moved, namely the sensor is moved, the temperature sensor will obtain a sensing result at a different place. Using an autonomous temperature sensor in such situations makes it possible to continuously keep track of at which place the sensor is sensing temperature.

Further, if the sensor network controller 4 is capable of incorporating autonomous sensors, it is possible to easily add a new autonomous sensor to the sensor network controller 4 in a manner similar to so-called plug-and-play, for example.

The type of the sensors 5 is typically selected in accordance with a particular purpose including detection of car thefts, house break-ins, and fires, for example, and the sensors 5 are placed at positions suitable for the particular purpose. Further, the sensor network 3 is typically configured for a particular purpose, and the processes to achieve the particular purpose, such as monitoring and reporting, are performed by the central apparatus 2, for example, in the sensor networks 3. The system of FIG. 2 enables the sensors installed for a particular purpose as described above to be used for another purpose.

Note that, the sensors 5 can be divided into three major types as to methods of reporting a sensing result, that is, how they transfer sensing data to the sensor network controller 4: cyclic, event-responsive, and polling. A cyclic sensor automatically senses at a predetermined time cycle to convey a sensing result. An event-responsive sensor automatically conveys a sensing result when it has detected a predetermined event, for example, when it has detected a physical quantity greater than or equal to a threshold value. A polling sensor senses and conveys a sensing result in response to a request for reporting data from the sensor network controller 4.

(Sensor Network Controller)

Figure 5:
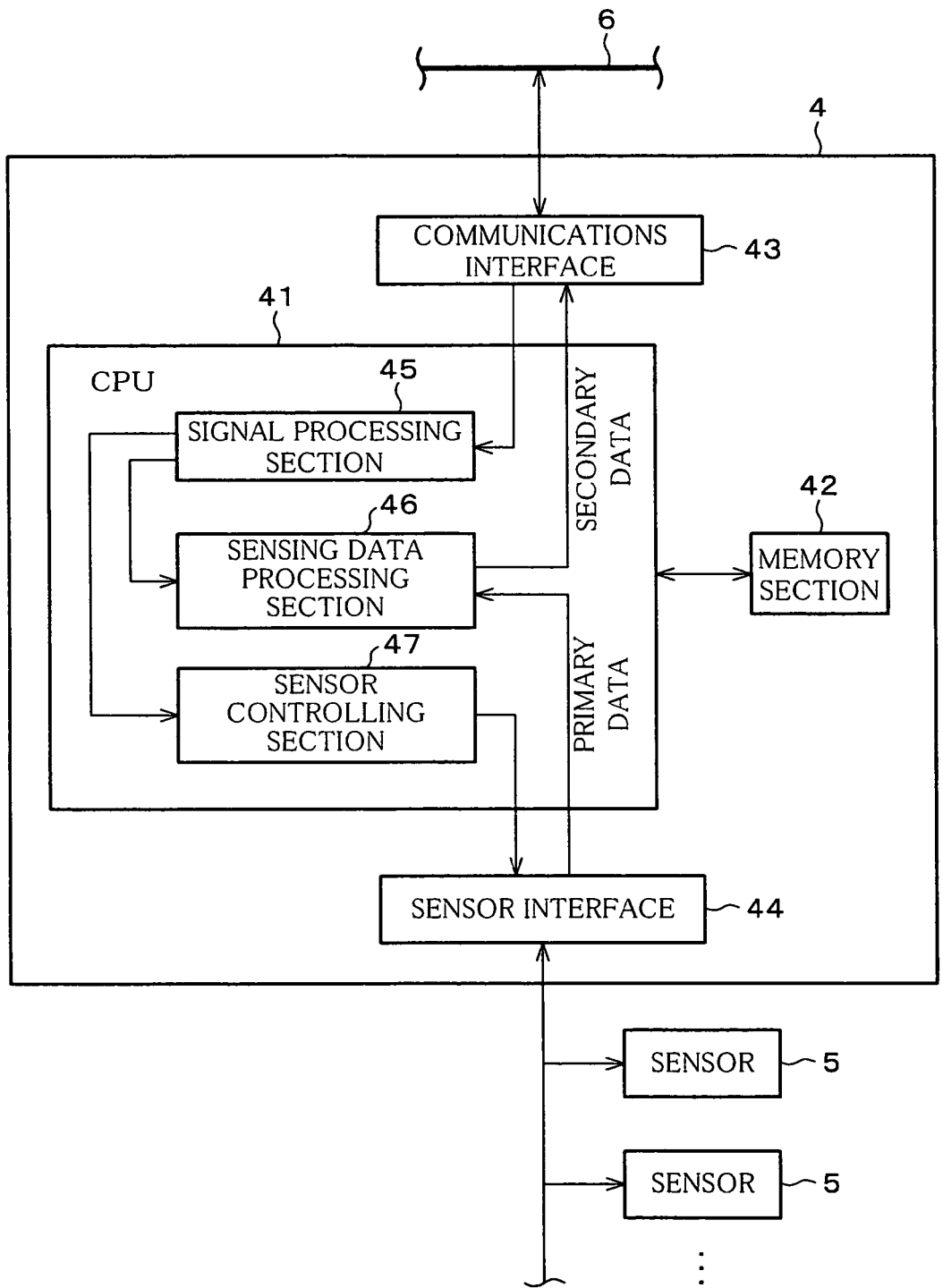
FIG. 5 is a block diagram illustrating the internal structure of a sensor network controller.

FIG. 5 is a block diagram illustrating the internal structure of the sensor network controller 4. The sensor network controller 4 includes a CPU (Central Processing Unit) 41 executing various processes; a memory section 42 holding various data; a communications interface 43 providing an interface to the communications network 6; a sensor interface 44 providing an interface to the sensors 5.

The CPU 41, based on its computing functions, executes various data processing and produces instructions to various control circuits. The CPU 41 controls the entire sensor network controller 4.

Further, the CPU 41 functions as function blocks, that is, a signal processing section 45, a sensing data processing section 46, and a sensor controlling section 47.

In accordance with a control signal sent from the central apparatus 2 via the communications network 6 and the communications interface 43, the signal processing section 45 controls a process of the sensing data in the sensing data processing section 46, and a process of controlling the sensors 5 in the sensor controlling section 47.

The sensing data processing section 46 performs a predetermined process, if necessary, on sensing data (primary data). The sensing data is sensing results sent from the sensors 5 via the sensor interface 44. The sensing data processing section 46 sends the processed sensing data (secondary data) to the central apparatus 2 via the communications interface 43 and the communications network 6.

Note that, the sensing data processing section 46 may cause the memory section 42 to store the secondary data, and to send the secondary data to the central apparatus 2 in response to a request from the central apparatus 2.

The type of process the sensing data processing section 46 performs on sensing data is determined by the signal processing section 45. With this, only useful sensing data among sensing data from the sensors 5 is sent to the central apparatus 2, so that data sent to the central apparatus 2 is reduced.

For example, it is assumed that a video camera as the sensor 5 constantly sends three screens of image data per second as the primary data, each screen containing data of about 20 kilobit to 30 kilobit. The sensing data processing section 46 performs a process on the primary data, such as thinning down of images by eliminating images that do not much differ from the other images. The sensing data processing section 46 thus creates the secondary data which is reduced and useful.

The sensor controlling section 47 sends control signals to the sensors 5 via the sensor interface 44 so as to control the sensors 5. The control of the sensor 5 includes a control of a transmission cycle of sensing data in a cyclic sensor, a control of a threshold value in an event-responsive sensor, a polling control in a polling sensor, and a motion control of an active sensor. How the sensor controlling section 47 controls the sensor 5 depends on an instruction from the signal processing section 45.

The memory section 42 stores programs and data to be used in various processes in the CPU 41.

(Server)

Figure 6:
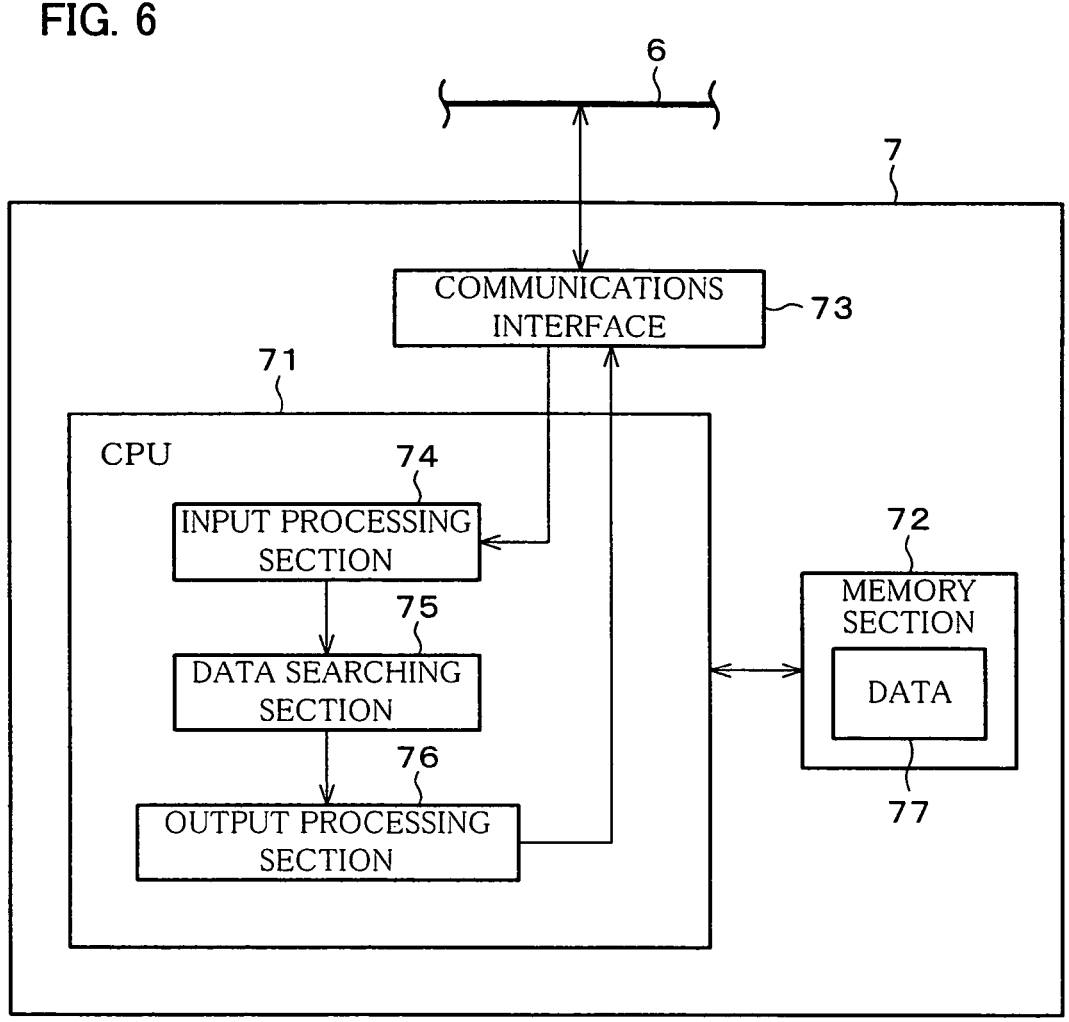
FIG. 6 is a block diagram illustrating the internal structure of a server.

FIG. 6 is a block diagram illustrating the internal structure of the server 7. The server 7 holds various data, and provides requested data in response to access from the outside via the communications network 6. The data may be various data such as weather data at various places, map data at various places, and data of products in manufactures, dealers, etc. Note that, two or more servers 7 may be provided to the system of FIG. 2.

The server 7 is provided with a CPU 71 executing various processes, a memory section 72 holding the various data, and an interface 73 to the communications network 6.

The CPU 71, based on its computing functions, executes various data processing and produces instructions to various control circuits. The CPU 41 controls the entire server 7.

Further, the CPU 71 functions as function blocks, that is, an input processing section 74, a data searching section 75, and an output processing section 76.

The input processing section 74 performs an input process on a data request signal sent from the outside via the communications network 6 and the communications interface 73. The input processing section 74 then recognizes a content requested by the data request signal and sends the requested content to the data searching section 75.

In accordance with the requested content sent from the input processing section 74, the data searching section 75 searches the data held in the memory section 72 and extracts data suitable for the requested content. The data searching section 75 then sends the extracted data as a search result to the output processing section 76. If the data searching section 75 finds no data suitable for the requested content, the data searching section 75 sends this result as the search result to the output processing section 76.

The output processing section 76 performs a process of sending the search result of the data searching section 75 to a requester, namely the sender of the data request signal, via the communications interface 7 and the communications network 6.

In addition to the various data, the memory section 72 stores programs and data to be used in various processes in the CPU 71.

(User Terminal Device)

Figure 7:
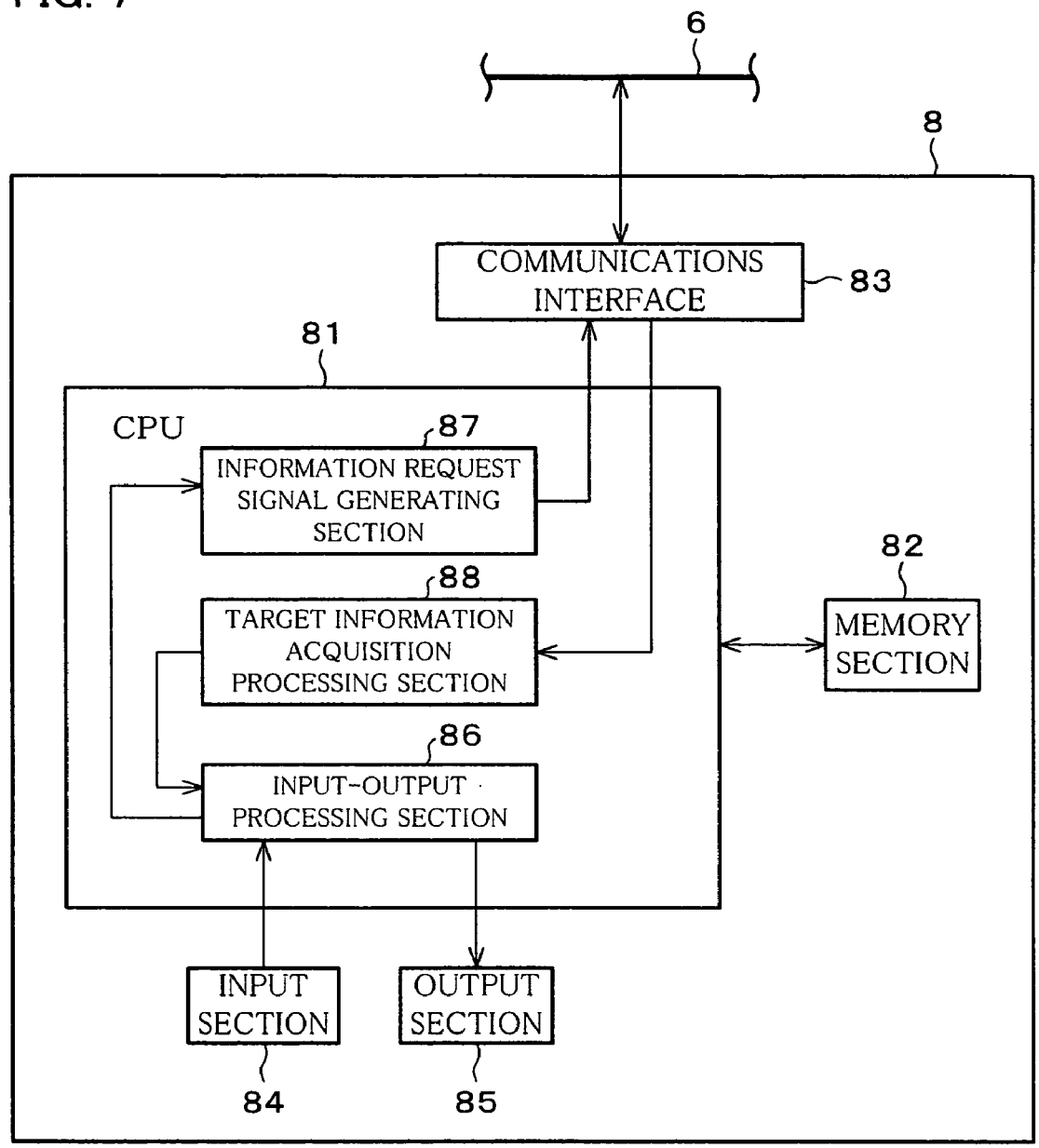
FIG. 7 is a block diagram illustrating the internal structure of a user terminal device.

FIG. 7 is a block diagram illustrating the internal structure of the user terminal device 8. The user terminal device 8 requests information from the central apparatus 2, and receives information from the central apparatus 2. The user terminal device 8 may be, for example, a personal computer, a cellular phone unit, and a PDA (Personal Digital Assistant) having a communication function.

The user terminal device 8 is provided with a CPU 81 executing various processes, a memory section 82 holding various data, a communications interface 83 to the communications network 6, an input section 84 for receiving an input from the user, and an output section 85 for presenting information, etc., to the user.

The CPU 81, based on its computing functions, executes various data processing and produces instructions to various control circuits. The CPU 81 controls the entire user terminal device 8.

Further, the CPU 81 functions as function blocks, that is, an input-output processing section 86, an information request signal generating section 87, and a target information acquisition processing section 88.

The input-output processing section 86 performs an input process on an input from the user when it receives the input through the input section 84. The input-output processing section 86 sends a content of the input to the information request signal generating section 87 if the input is an information request to the central apparatus 2.

The information request signal generating section 87 generates an information request signal in accordance with the content of the information request sent from the input-output processing section 86. The information request signal generating section 87 then sends the generated information request signal to the central apparatus 2 via the communications interface 83 and the communications network 6. The information request signal contains the content of the information request as text data in a natural language (such as Japanese) that is input from the user, for example.

When receiving the target information sent via the communications network 6 and the communications interface 83, the target information acquisition processing section 88 acquires the target information, performs a process on the target information, if necessary, and sends the information to the input-output processing section 86. The input-output processing section 86 causes the output section 85 to output the information from the target information acquisition processing section 88.

The memory section 72 stores various programs and data to be used in various processes in the CPU 81. The input section 84 may be a keyboard or mouse of a personal computer, an operational key of a cellular phone unit and PDA, and the like. The output section 85 may be displays such as an LCD (Liquid Crystal Display) and a CRT (Cathode Ray Tube) display, a speaker, and the like.

(Central Apparatus)

Figure 1:
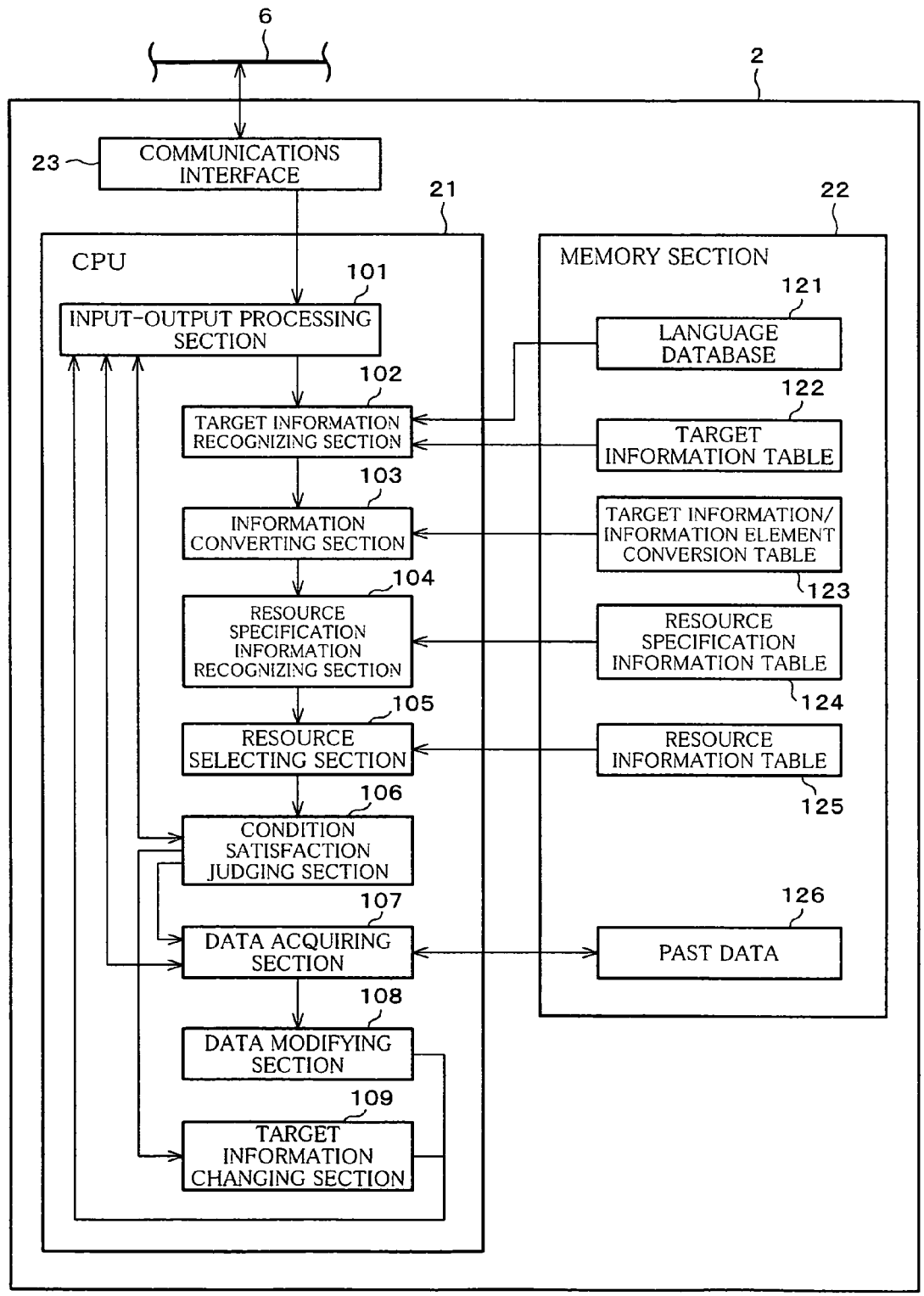
FIG. 1 is a block diagram illustrating the internal structure of a central apparatus for a sensor network system in accordance with an embodiment of the present invention.

FIG. 1 is a block diagram illustrating the internal structure of the central apparatus 2. The central apparatus 2 performs the above-described processes in accordance with the information request form the user terminal device or detection of a particular state at the sensor 5, and makes up an information processing device of the present invention. Note that, a part of functions explained below may be carried out by the sensor network controller 4.

The central apparatus 2 is, for example, a computer (e.g., personal computer or large computer) with communication function and includes: a CPU 21 implementing various processes; a memory section 22 in which various data is stored; and a communications interface 23 providing an interface to the communications network 6. Although not shown, the central apparatus 2 typically includes an input section (e.g., keyboard and mouse) and a display section (e.g., display device) to allow inputs and updates for the various information in the memory section 22.

The CPU 21, based on its computing functions, executes various data processing and produces instructions to various control circuits. The CPU 21 controls the entire central apparatus 2, the sensor network controller 4, and the sensors 5.

Further, the CPU 21 functions as function blocks, that is, an input-output processing section 101, a target information recognizing section 102, an information converting section 103, a resource specification information recognizing section 104, a resource selecting section 105, a condition satisfaction judging section 106, a data acquiring section 107, a data modifying section 108, and a target information changing section 109.

The memory section 22 stores various programs and data to be used in the various processes in the CPU 21. Note that, as the data, the memory section 22 stores a language database 121, a target information table 122, a target information/information element conversion table 123, a resource specification information table 124, a resource information table 125, and past data 126.

The communications interface 23 functions as an interface to the communications network 6. The communications interface 23 allows the sensor network system 1 to communicate data with other sensor network systems 1, the server 7, and the user terminal device 8.

Figure 8:
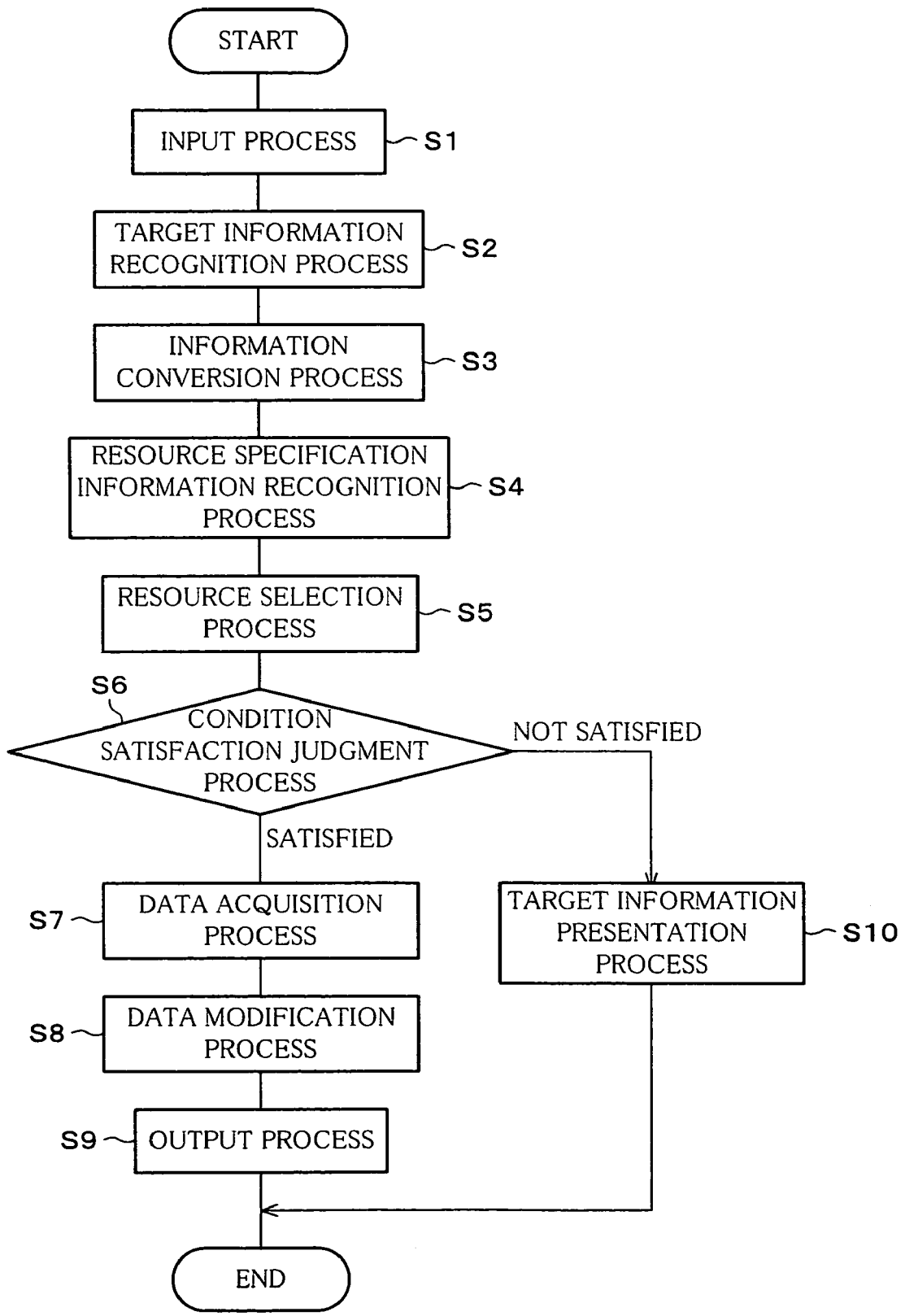
FIG. 8 is a flow chart showing a process flow in the central apparatus shown in FIG. 1.

The following will explain processes in the central apparatus 2 with reference to a flow chart of FIG. 8 showing a process flow in the central apparatus 2.

The central apparatus 2 performs processes in accordance with the information request from the user terminal device 8 or detection of a particular state at the sensor 5. The user terminal device 8 sends to the central apparatus 2 via the communications network 6, an information request signal for designating target information which is information requested by the user. Further, the sensor 5 sends to the central apparatus 2 via the communications network 6, a sensing signal indicating a sensing result.

The information request signal and the sensing signal are received by the communications interface 23, and supplied to the CPU 21 through the input-output processing section 101 (step S1). Namely, the input-output processing section 101 functions as a signal receiving section for receiving the information request signal for requesting information from the central apparatus 2, and a sensing result receiving section for receiving data of a sensing result obtained by the sensor 5.

Note that, the input-output processing section 101 also functions as a communication processing section for communicating data with the user terminal device 8; a first communication processing section for communicating data with another sensor network system 1; and a second communication processing section for communicating data with the server 7.

The target information recognizing section 102 performs a target information recognition process (step S2) in accordance with the information request signal or sensing signal received by the input-output processing section 101.

First, the target information recognition process in accordance with the information request signal will be explained.

The information request signal contains, for example, text data in a natural language (such as Japanese) that is input by the user on the user terminal device 8. The text data is used to designate the target information.

The target information recognizing section 102 interprets the natural language, referring to the language database 121 (dictionary file) in which keywords, etc., are registered. Here, the target information recognizing section 102 specifies and recognizes one of target information pre-set in the target information table 122 that is closest to the target information designated by the information request signal. The target information table 122 stores pre-set target information as shown in FIG. 9(a).

Note that, the information request signal may designate the target information using data (such as sound data) other than the text data.

Further, the target information recognizing section 102 recognizes as a destination ID of the target information, sender data contained in the information request signal. Here, the destination ID specifies a destination to which the target information is to be sent via the communications network 6. The destination ID may be the IP address under TCP/IP of the user terminal device 8, for example. Note that, the destination may be other than the sender of the information request signal.

Note that, the target information recognizing section 102 may recognize the target information and a parameter of the target information. The parameter specifies a place or other factor with respect to a certain state if the target information is information indicating the certain state such as whether or not there is a person, and whether or not it is raining, for example. The target information recognizing section 102 can extract the parameter from the text data, referring to the language database 121. If the target information is designated by text data in a natural language, "Is it raining in Kyoto?", for example, the target information is "whether or not it is raining (raining situation)," and the parameter is "Kyoto."

Next, the target information recognition process in accordance with the sensing signal will be explained. The sensing signal includes data indicating a sensing result and a sensor that sensed the sensing result. The target information recognizing section 102 (sensing result converting section) specifies and recognizes from the target information table 122, target information and a destination ID (destination information) to which the target information is to be sent. The target information and destination ID are pre-set and stored in the target information table 122 (target information table storing section) in association with the sensing result and sensor indicated by the sensing signal. The target information table 122 stores pre-set correspondence among a sensing result, a sensor, target information, and a destination ID, as shown in FIG. 9(b).

Here, the target information is information required in response to detection of a corresponding sensing result. The destination ID specifies a destination to which the target information is to be sent via the communications network 6. The destination ID may be the IP address under TCP/IP of the user terminal device 8, for example, if the destination is the user terminal device 8.

The information converting section 103 performs an information conversion process (step S3) of converting into a combination of information elements, the target information recognized by the target information recognizing section 102. Each information element is pre-set information appropriate for making up the target information. The information converting section 103 performs the information conversion process referring to the target information/information element conversion table 123. The target information/information element conversion table 123 (target information/information element conversion table storing section) stores pre-set correspondence between target information and an information element, as shown in FIG. 10. For example, it is assumed that the target information is "A." Here, if the target information "A" is composed of a combination of information "A1" and "A2", or if the target information "A" can be divided into information "A1" and "A2", the information elements are "A1" and "A2."

Note that, the target information is typically composed of a combination of a plurality of information elements, but the target information may be composed of only one information element. In the present specification, the process of "converting the target information into a combination of information elements" may refer to the process of converting the target information into one information element.

Further, if the target information recognizing section 102 has recognized the parameter, the parameter is also added to the information element after the conversion.

The resource specification information recognizing section 104 performs a resource specification information recognition process (step S4) of recognizing resource specification information with respect to the information element converted by the information converting section 103. The resource specification information specifies a resource that can be an information source of the information element.

Here, the resource includes a sensor 5 of the sensor network system 1, a sensor 5 of another sensor network system 1, and a file and a database record in the server 7 which contain various data. Further, the resource specification information is information for specifying a resource. The resource specification information may be an IP address (sensor ID) for specifying a sensor 5, an URL (Uniform Resource Locator) for specifying a file, etc., in the server 7, for example.

The resource specification information for specifying a sensor 5 may be information specifying the type (including its detection target) and layout (position, installation site) of the sensor 5, for example, with which the sensor 5 can be specified or roughly specified. Further, the resource specification information for specifying a file, etc., in the server 7 may be a keyword, etc., associated with data contained in the file, etc., with which the file, etc., can be specified or roughly specified. Namely, the resource specification information may specify a resource either directly or indirectly.

With the information indirectly specifying a resource, it is possible to specify the resource more flexibly. For example, if the sensor 5 as the resource is an autonomous sensor capable of moving, the sensor 5 can be specified in accordance with the position of the sensor 5 at a time point when the data acquiring section 107 acquires the data. With this, it is possible to obtain more suitable data, and utilize the sensors 5 more effectively.

The resources specification information recognizing section 104 performs the resource specification information recognition process, referring to the resource specification information table 124. In other words, the resource specification information recognizing section 104 associates an information element with a real-world resource. The resource specification information table 124 (resource specification information table storing section) stores pre-set correspondence between an information element and resource specification information, as shown in FIG. 11. If a parameter has been added to the information element, the correspondence between (A) a combination of the information element and the parameter and (B) resource specification information is set.

Note that, the resource specification information may further contain information (data modification information) indicating a required process for modifying data from the resource if the data needs to be modified; and information (communication information) about communications for accessing the resource.

The data modification information may indicate, for example, a process of computing and converting an electric resistance value sent from a sensor 5 into temperature information if the sensor 5 as the resource is for obtaining the electric resistance value correlating a temperature. Further, the data processing information may indicate a process using a combination of acquired data. For example, the indicated process may be a process of obtaining information about a moving direction from time-series positional information sent from a GPS, and a process of obtaining information about a moving speed from both time-series positional information sent from a GPS and time information from a clock.

The process of modifying the data is performed by the data modifying section 108 in accordance with the data modification information. Further, the communication information may be a communication protocol and the like used for accessing the resource. The communication information is used by the data acquiring section 107 to acquire data from the resource.

Incidentally, the information converting section 103 and the resource specification information recognizing section 104 make up a converting section. In other words, the converting section divides the target information into a combination of information elements which appropriately compose the target information, and converts the information elements into resource specification information which specifies resources that can be information sources of the respective information elements.

The resource selecting section 105 performs a resource selection process (step S5) of actually selecting a resource in accordance with the resource specification information recognized by the resource specification information recognizing section 104. For example, the resource selecting section 105 selects one resource if the resource specification information table 124 associates a certain information element with a plurality of resources, for example.

Note that, if the resource specification information indirectly specifies a sensor as the resource, the resource selecting section 105 refers to the resource information table 125 and converts the resource specification information into the resource specification information (sensor ID) directly specifying the sensor as the resource. The resource information table 125 shows correspondence between sensor information and a sensor ID, as shown in FIG. 12. The sensor information indicates the type (including its detection target) and position of each of the sensors 5. Here, by searching for the sensor information in the resource information table 125 in accordance with the resource specification information in the resource information table 125, for example, it is possible to specify the sensor 5 and recognize the sensor ID of the specified sensor 5. If the sensor 5 is an autonomous sensor, each piece of sensor information sent from the sensor 5 should update the sensor information in the resource information table 125.

The condition satisfaction judging section 106 performs a condition satisfaction judgment process (step S6) of judging in accordance with a selection result of the resource selecting section 105, whether or not the condition for acquiring information composing the target information is satisfied, namely, whether or not data can be actually acquired from the resource(s) in accordance with the resource specification information associated with the information element. The condition satisfaction judging section 106 passes the judgment by confirming via the input-output section 101, whether or not the resource(s) in accordance with the resource specification information is actually connected, whether or not the resource(s) can be communicated, or other conditions. Here, the condition satisfaction judging section 106 may judge that the condition is satisfied if it is possible to acquire data from some of the resources, instead of all of the resources, in accordance with the resource specification information.

Note that, the condition satisfaction judgment process may be performed with respect to data after the data is acquired by the data acquiring section 107, or after the data is further modified by the data modifying section 108.

The data acquiring section 107 performs a data acquisition process (step S7) of actually acquiring data via the input-output processing section 101 from the resource in accordance with the resource specification information. Specifically, the data acquiring section 107 acquires data of a sensing result obtained by a sensor 5 in the sensor network system 1 in question or another sensor network system 1, and data of an information element stored in the server 7.

Note that, the data of a sensing result obtained by a sensor 5 may be data processed by the sensing data processing section 46 of the sensor network controller 4 (see FIG. 5), data temporarily held in the memory section 42 of the sensor network controller 4, and data acquired by the data acquiring section 107 and temporarily held as the past data 126 in the memory section 22. Further, the data of an information element stored in the server 7 may be data to be modified into the information element later.

The data acquiring section 107 acquires the data of a sensing result obtained by a sensor 5 in the sensor network system 1 in question, in the following manner. Namely, the data acquiring section 107 sends a control signal to the sensor network controller 4, so as to request the sensor 5 or the memory section 42 of the sensor network controller 4 to send the data of a sensing result. Note that, if the data of a sensing result is unilaterally sent from the sensor network controller 4 to the central apparatus 2 without the request of the data acquiring section 107, the data acquiring section 107 causes the memory section 22 to hold the data of a sensing result as the past data 126.

The data acquiring section 107 acquires the data of a sensing result obtained by a sensor 5 in another sensor network system 1 in the following manner. Namely, the data acquiring section 107 sends a data request signal containing the resource specification information to the central apparatus 2 of another sensor network system 1 through the input-output processing section 101. In the central apparatus 2 that received the data request signal, the data request signal is sent to the data acquiring section 107 via the input-output processing section 101. In accordance with the resource specification information in the data request signal, the data acquiring section 107 acquires the data of a sensing result obtained by the sensor 5 in the other sensor network system 1, and sends the acquired data of the sensing result to the central apparatus 2 that originally sent the data request signal. In the central apparatus 2 that originally sent the data request signal, the data acquiring section 107 acquires the data of the sensing result sent through the input-output processing section 101.

The data acquiring section 107 acquires the data of an information element stored in the server 7 in the following manner. Namely, the data acquiring section 107 sends a data request signal containing the resource specification information to the server 7 via the input-output processing section 101. Then, the data acquiring section 107 acquires via the input-output processing section 101, the data of the information element sent from the server 7.

The data modifying section 108 performs a data modification process (step S8) on the data acquired by the data acquiring section 107, if necessary, in accordance with the data modification information as described earlier. In the data modification process, the data modifying section 108 may further generate data that integrates data corresponding to the information elements.

The input-output processing section 101 performs an output process (step S9). In the output process, the input-output processing section 101 outputs in accordance with the destination ID recognized by the target information recognizing section 102, the data acquired by the data acquiring section 107 and, when needed, modified by the data modifying section 108. Here, the input-output processing section 101 functions as an output section. The destination is a user terminal device 8 if the target information is requested by the user terminal device 8 as described earlier. If the target information is in response to a sensing result of the sensor 5, the destination is a destination specified by the destination ID associated with the sensing result in the target information table 122 (see FIG. 9(*b*)).

The data that is output in the output process corresponds to a combination of information elements composing the target information, and either a list of data corresponding to the information elements or an integration of data corresponding to the information elements. The output data may be data directly indicating the target information; or data from which the user, etc., can recognize the target information, i.e., data indicating information close to the target information.

The target information changing section 109 performs a target information presentation process (step S10) if the condition satisfaction judging section 106 judges that the condition is not satisfied, provided that the target information is requested with the information request signal sent from the user terminal device 8. In the target information presentation process, the target information changing section 109 changes the requested target information to target information that can be provided under the condition, and sends the changed target information to the user terminal device 8 via the input-output processing section 101. With this, the target information that can be provided is presented to the user of the user terminal device 8.

With the central apparatus 2, even if the user terminal device 8 or its user, which is the sender of the information request signal, does not know what type(s) of sensors 5 the sensor network system 1 includes, the sender can request the target information by means of a natural language, for example, and obtain either the target information or information close to the target information. This is because the information converting section 103 divides the target information into information elements which are information that can be acquired from resources, and the data acquiring section 107 acquires data from resources that can be information sources of the respective information elements. In other words, the central apparatus 2 dynamically selects resources in accordance with the target information.

With this, it is possible to obtain more information from the sensor network system 1, and effectively utilize the sensors 5 in the sensor network system 1 for acquiring various types of information.

Note that, the central apparatus 2 can also acquire the information elements from data of a sensing result obtained by a sensor 5 in another sensor network system 1, and from the server 7. This can broaden a range of data that can be acquired as the information elements, thereby configuring the central apparatus 2 that can provide more accurate target information.

Further, in response to a particular sensing result obtained by a sensor 5, the central apparatus 2 can provide a necessary destination with either the target information or information close to the target information required in accordance with the sensing result. In other words, it is possible to convert a sensing result of a sensor 5 into another information relating to the sensing result, and provide the converted information.

With this, it is possible to effectively utilize the sensors 5 in the sensor network system 1 for obtaining various types of information.

CONCRETE EXAMPLE 1

Referring to FIGS. 1, and 8 through 12, the following will explain a concrete example where the user of the user terminal device 8 obtains information from the central device 2 of the sensor network system 1.

It is assumed here that the user designates the target information on the user terminal device 8 by means of text data in a natural language: "Is there a person in the conference room?" (Case 1) and "Is it raining in Kyoto?" (Case 2).

The target information in the target information table 122 (FIG. 9(a)) and the target information/information element conversion table 123 (FIG. 10) includes "room availability" and "raining situation." The target information recognizing section 102 recognizes the "room availability" as the target information and "conference room" as the parameter in Case 1, and the "raining situation" as the target information and "Kyoto" as the parameter in Case 2.

The "room availability" in Case 1 is associated with information elements, namely, "presence of a human body," "room lighting situation," "room temperature situation," and "room sound situation," in the target information/information element conversion table 123. These information elements are associated with resource specification information, namely, an "infrared ray sensor," a "light ON/OFF sensor," a "temperature sensor," and a "microphone," respectively, in the resource specification information table 124 (FIG. 11).

In accordance with the parameter "conference room" and the resource specification information as described above, the resource selecting section 105 selects the above-described sensors provided in the conference room, and the data acquiring section 107 acquires data of sensing results from the selected sensors.

Here, even if the conference room is not provided with an infrared sensor, the central apparatus 1 can acquire data of a sensing result obtained by the other sensors and presents the acquired data to the user. With this, in accordance with the data on lighting, temperature, and sound, and the like, the user can judge whether or not there is a person in the conference room.

With this, it is possible to allow a sensor 5 to be used for a purpose other than the intended purpose. For example, a sensing result of a temperature sensor provided for security may be used as information about the occurrence of a fire.

Further, the "raining situation" in Case 2 is associated with information elements, namely, "rainfall," and "situation of vehicle wipers," in the target information/information element conversion table 123. In the resource specification information table 124 (FIG. 11), the "rainfall" is associated with resource specification information, namely, a "rain gauge" and a "database of the Meteorological Agency," whereas the "situation of vehicle wipers" is associated with a "wiper ON/OFF sensor."

In association with the parameter "Kyoto" and the resource specification information as described above, the resource selecting section 105 selects a rain gauge located in Kyoto, a wiper ON/OFF sensor of a vehicle driving in Kyoto, and a record of Kyoto in a database of the Meteorological database. Then, the data acquiring section 107 acquires information from these resources.

Here, even if the central apparatus 1 cannot actually access a database of the Meteorological Agency and a rain gauge, the central apparatus 2 can acquire data of a sensing result obtained by a wiper ON/OFF sensor of a vehicle, and present the acquired data to the user. With this, the user can judge whether or not it is raining in Kyoto.

CONCRETE EXAMPLE 2

With reference to FIGS. 1, and 8 through 12, the following will explain a concrete example of the process in accordance with the detection of a predetermined state at the sensor 5.

It is assumed here that a sensing result is supplied to the user terminal device 8 provided to a vehicle, if "a fuel sensor in the vehicle senses a small remaining amount of fuel as the sensing result" (Case 3).

The target information table 122 (FIG. 9(b)) shows correspondence among the "fuel sensor in the vehicle" as the sensor, a "small remaining amount" as the sensing result, "directions to a nearby gas station" as the target information, and an "ID of the user terminal device provided to the vehicle" as the destination ID.

The "directions to a nearby gas station" is associated with information elements, namely, "positional information of the vehicle" and "map information indicating the position of a gas station," in the target information/information element conversion table 123. These information elements are associated with the resource specification information, namely, a "GPS" and a "map database," respectively, in the resource specification information table 124 (FIG. 11). Further, in the resource specification information table 124, the "map information indicating the position of a gas station" is associated with an "enlargement process of the present position" as the data modification process.

In accordance with the resource specification information as described above, the resource selecting section 105 selects the resources. From the selected resources, the data acquiring section 107 acquires data, namely the positional information of the vehicle and the map information indicating the position of a gas station. Further, the data modifying section 108 performs the enlargement process on the map information indicating the position of a gas station so as to enlarge an area around the position of the vehicle in accordance with the positional information of the vehicle. Map information indicating the position of a gas station, which is enlarged around the position of the vehicle, is supplied to the user terminal device 8.

Further, other than the example of the fuel sensor, another example may be such that directions to a nearby maintenance shop are provided if a sensor for sensing a defect in mechanical parts, etc., of the vehicle senses a defect. In this case, it is also possible to order a necessary part via the communications network 6, for example.

As described above, in response to a sensing result of a particular sensor 5, the central apparatus 2 composes the target information by combining data from other resources, for example, and outputs the target information to a predetermined destination. This can be applied to prevent a false report in abnormality detection by improving the precision of judgment. Namely, when a particular sensor 5 senses an abnormality, the central apparatus 2 virtually patrols the other sensors 5 and the sensor network 3, and collects and integrates local information around the abnormality (such as an image of a site of the abnormality) so as to provide the integrated information. Further, another application is to calculate in combination with map information and traffic information, an optimum route to a site of an abnormality if a particular sensor 5 senses the abnormality.

(Supplement)

Note that, each section from the input-output processing section 101 to the target information modifying section 109 as described above may be realized by a program (information processing program) executed by the CPU 21 of the central apparatus 2.

Further, the information processing program is stored in a computer-readable storage medium such as the memory section 22 of the central apparatus 2. Note that, the information processing program may be supplied from a program medium other than the memory section 22. The program medium is read by a drive device provided as an external memory device to the central apparatus 2, for example.

The program medium may be a storage medium arranged to be detachable from the main unit. The storage medium may be a medium fixedly carrying a program, including a tape type such as a magnetic tape and a cassette tape; a disk type including a magnetic disk such as a floppy (registered trademark) disk and a hard disk, and an optical disk such as CD-ROM, MO, MD, and DVD; a card type such as an IC card (including a memory card) and an optical card; a semiconductor memory such as mask ROM, EPROM, EEPROM, and flash ROM.

Further, the central apparatus 2 may download the information processing program through a communications network including the Internet. Note that, if the information processing program is downloaded from a communications network as described above, a program for downloading may be either pre-stored in the central apparatus 2 or installed from another storage medium. Note that, the content stored in the storage medium is not limited to a program but may be data.

As described above, an information processing device of the present invention in a sensor network system including a plurality of sensors and the information processing device collecting data of sensing results obtained by the plurality of sensors is arranged so as to include a signal receiving section for receiving an information request signal with which information is requested from the information processing device; a converting section for dividing target information which is requested with the information request signal into a combination of information elements which appropriately compose the target information, and converting the information elements into resource specification information which specifies resources that can be information sources of the respective information elements; a data acquiring section for acquiring data of sensing results obtained by one or more of the plurality of sensors that are selected in accordance with the resource specification information; and an output section for outputting information based on the data acquired by the data acquiring section.

With this arrangement, the information request signal is supplied to the signal receiving section of the information processing device. The information request signal is used for requesting the information processing device to provide information, and sent from a user terminal device outside the sensor network system, for example.

The information request signal designates the target information which is requested with the signal. The converting section converts the target information into a combination of information elements which appropriately compose the target information, and converts the information elements into resource specification information which specifies resources that can be information sources of the respective information elements. In order to divide the target information into the combination of information elements, correspondence between expected target information and a combination of information elements, for example, may be pre-set and pre-stored as a table.

Next, the data acquiring section acquires data of sensing results obtained by one or more of the plurality of sensors that are selected in accordance with the resource specification information. Then, the output section outputs information based on the data acquired by the data acquiring section to the user terminal device which is the sender of the information request signal, for example.

With this arrangement, even if the sender of the information request signal does not know what type(s) of sensors the sensor network system includes, the sender can request the target information by means of a natural language, for example, and obtain either the target information or information close to the target information. This is because the converting section divides the target information into information elements which are information that can be acquired from sensing results of the sensors, and the data acquiring section acquires sensing results of one or more of the sensors corresponding to the information elements. In other words, sensor(s) in the sensor network system are dynamically selected in accordance with the target information.

With this, it is possible to obtain a wider variety of information from the sensor network system and effectively utilize sensors in the sensor network system for acquiring the various types of information.

The information processing device of the present invention is preferably arranged so as to further include a first communication processing section for communicating data with another sensor network system capable of data communications with the sensor network system, the data acquiring section further acquiring via the first communication processing section, data of a sensing result obtained by a sensor in the other sensor network system in accordance with the resource specification information.

With this arrangement, data of a sensing result obtained by a sensor on another sensor network system can be also acquired. This can broaden a range of data that can be acquired as the information elements, thereby configuring an information processing device that can provide more accurate target information.

The information processing device of the present invention is preferably arranged so as to further include a second communication processing section for communicating data with a server capable of data communications with the sensor network system and capable of providing data of the information elements, the data acquiring section further acquiring via the second communication processing section, the data of the information elements from the server in accordance with the resource specification information.

With this arrangement, data of the information elements can be obtained from not only the sensor network system but also the server holding the data. This can broaden a range of data that can be acquired as the information elements, thereby configuring an information processing device that can provide more accurate target information.

The information processing device of the present invention is preferably arranged so that the resource specification information specifies the one or more of the plurality of sensors by designating a type and position of each of the one or more of the plurality of sensors.

With this arrangement, the resource specification information specifies a sensor as the resource by designating a type and position of the sensor. In a case where the resource is specified in accordance with the resource specification information, the sensor can be more flexibly specified if the type(s) and layout of the sensors on the sensor network system are comprehended. For example, if the sensor moves, the sensor can be specified in accordance with the position of the sensor at a time point when the data acquiring section acquires the data.

With this, it is possible to obtain more suitable data from the sensor network system, and utilize the sensors in the sensor network system more effectively.

A sensor network system of the present invention is arranged so as to include the foregoing information processing device and the plurality of sensors. Further, an information processing program of the present invention for causing the foregoing information processing device to operate is arranged so that the program causes a computer to function as the sections. Further, a computer-readable storage medium of the present invention contains the foregoing information processing program. With these arrangements, it is also possible to achieve the effect as explained with respect to the foregoing information processing device.

An information processing device of the present invention in a sensor network system including a plurality of sensors and the information processing device collecting data of sensing results obtained by the plurality of sensors is arranged so as to include a sensing result receiving section for receiving data of a sensing result obtained by one of the plurality of sensors; a sensing result converting section for converting the data of the sensing result obtained by the one of the plurality of sensors into target information which is associated with the sensing result and which is required in response to the sensing result; a converting section for dividing the target information into a combination of information elements which appropriately compose the target information, and converting the information elements into resource specification information which specifies resources that can be information sources of the respective information elements; a data acquiring section for acquiring data of the information elements in accordance with the resource specification information; and an output section for outputting information based on the data acquired by the data acquiring section.

With this arrangement, the data of a sensing result of the sensor is supplied to the sensing result receiving section of the information processing device. The data of the sensing result is converted by the sensing result converting section into the target information which is required in response to the particular sensing result. Then, the converting section divides the target information into a combination of information elements which appropriately compose the target information, and converts the information elements into resource specification information which specifies resources that can be information sources of the respective information elements. In order to divide the target information into the combination of information elements, correspondence between likely target information and a combination of information elements, for example, may be pre-set and pre-stored as a table.

Then, the data acquiring section acquires data of sensing results in accordance with the resource specification information, and the output section outputs information based on the acquired data.

With this arrangement, in response to a particular sensing result obtained by a sensor, the information processing device can output and provide either the target information or information close to the target information required in accordance with the sensing result. In other words, it is possible to convert a sensing result of a sensor into another information relating to the sensing result and provide the converted information.

With this, it is possible to effectively utilize sensors in the sensor network system for obtaining various types of information.

The information processing device of the present invention may be arranged so that the data acquiring section acquires data of sensing results obtained by one or more of the plurality of sensors that are selected in accordance with the resource specification information.

Further, the information processing device of the present invention may be arranged so as to further include a first communication processing section for communicating data with another sensor network system capable of data communications with the sensor network system, the data acquiring section acquiring via the first communication processing section, data of a sensing result obtained by a sensor in the other sensor network system in accordance with the resource specification information.

Further, the information processing device of the present invention may be arranged so as to further include a second communication processing section for communicating data with a server capable of data communications with the sensor network system and capable of providing the data of the information elements, the data acquiring section acquiring via the second communication processing section, the data of the information elements from the server in accordance with the resource specification information.

With these arrangements, data can be acquired from the sensors and servers. This broadens a range of data that can be acquired as the information elements, thereby configuring an information processing device capable of providing accurate target information.

A sensor network system of the present invention is arranged so as to include the foregoing information processing device and the plurality of sensors. Further, an information processing program of the present invention for causing the foregoing information processing device to operate is arranged so that the program causes a computer to function as the sections. Further, a computer-readable storage medium of the present invention contains the foregoing information processing program. With these arrangements, it is also possible to achieve the effect as explained with respect to the foregoing information processing device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention can be applied to a sensor network system including a plurality of sensors and an information processing device collecting data of sensing results obtained by the sensors. The present invention is intended to effectively utilize the plurality of sensors in the sensor network system by using sensing results of the plurality of sensors to acquire various types of information.

The invention claimed is:

1. An information processing device in a sensor network system including a plurality of sensors and the information processing device collecting data of sensing results obtained by the plurality of sensors, the information processing device comprising:

a signal receiving section configured to receive an information request signal indicating target information which is information requested from the information processing device;

an information converting section configured to divide the target information into a combination of information elements which appropriately compose the target information in accordance with correspondence between the target information and the combination of information elements, each of the information elements being acquirable from one of the sensing results of the sensors, the correspondence being pre-set as a target information/information element conversion table; and a resource specification information recognizing section configured to recognize resource specification information corresponding to the respective information elements converted by the information converting section in accordance with a resource specification information table indicating correspondence between the respective information elements and the resource specification information which specifies resources that can be information sources of the respective information elements;

the resource specification information table including (i) data processing information which indicates a process required in processing data obtained from a resource and (ii) communication information which indicates a communication for accessing the resource, the data processing information and the communication information being added to the resource specification information;

the information processing device further comprising:

a data acquiring section configured to acquire data of sensing results obtained by one or more of the plurality of sensors that are selected in accordance with the resource specification information by using the communication information;

a data processing section configured to process the data acquired by the data acquiring section in accordance with the data processing information; and an output section configured to output information based on the data processed by said data processing section.

2. The information processing device as set forth in claim 1, further comprising:

a first communication processing section for communicating data with another sensor network system capable of data communications with said sensor network system, said data acquiring section further acquiring via said first communication processing section, data of a sensing result obtained by a sensor in the other sensor network system in accordance with the resource specification information.

3. The information processing device as set forth in claim 1, further comprising:

second communication processing section for communicating data with a server capable of data communications with said sensor network system and capable of providing data of the information elements, said data acquiring section further acquiring via said second communication processing section, the data of the information elements from the server in accordance with the resource specification information.

4. The information processing device as set forth in claim 1, wherein:

the resource specification information specifies the one or more of the plurality of sensors by designating a type and position of each of the one or more of the plurality of sensors.

5. The information processing device as set forth in claim 1, further comprising:

a target information recognizing section for specifying in accordance with the information request signal, the target information among a set of target information pre-set in a target information table.

6. A sensor network system comprising:

the information processing device as set forth in claim 1; and the plurality of sensors.

7. An information processing program for causing the information processing device as set forth in claim 1 to operate, wherein:

said program causes a computer to function as the sections.

8. A computer-readable storage medium containing the information processing program as set forth in claim 7.

9. An information processing device in a sensor network system including a plurality of sensors and the information processing device collecting data of sensing results obtained by the plurality of sensors, the information processing device comprising:

a sensing result receiving section configured to receive data of a sensing result obtained by one of the plurality of sensors;

a sensing result converting section configured to convert the data of said sensing result obtained by the one of the plurality of sensors into target information which is preliminarily associated with said sensing result as required information in response to said sensing result;

an information converting section configured to divide the target information into a combination of information elements which appropriately compose the target information in accordance with the correspondence between the target information and the combination of information elements, each of the information elements being acquirable from one of the sensing results of the sensors, the correspondence being pre-set as a target information/information element conversion table; and a resource specification information recognizing section configured to recognize resource specification information corresponding to the respective information elements converted by the information converting section in accordance with a resource specification information table indicating correspondence between the respective information elements and the resource specification information which specifies resources that can be information sources of the respective information elements;

the resource specification information table including (i) data processing information which indicates a process required in processing data obtained from a resource and (ii) communication information which indicates a communication for accessing the resource, the data processing information and the communication information being added to the resource specification information;

the information processing device further comprising:
a data acquiring section configured to acquire data of the information elements, in accordance with the resource specification information by using the communication information;
a data processing section configured to process the data acquired by the data acquiring section in accordance with the data processing information; and
an output section configured to output information based on the data processed by said data processing section.

10. The information processing device as set forth in claim 9, wherein:
said data acquiring section acquires data of sensing results obtained by one or more of the plurality of sensors that are selected in accordance with the resource specification information.

11. The information processing device as set forth in claim 9, further comprising:
a first communication processing section for communicating data with another sensor network system capable of data communications with said sensor network system,
said data acquiring section acquiring via said first communication processing section, data of a sensing result obtained by a sensor in the other sensor network system in accordance with the resource specification information.

12. The information processing device as set forth in claim 9, further comprising:
a second communication processing section for communicating data with a server capable of data communications with said sensor network system and capable of providing the data of the information elements,
said data acquiring section acquiring via said second communication processing section, the data of the information elements from the server in accordance with the resource specification information.

13. The information processing device as set forth in claim 9, wherein:
said sensing result converting section converts the data of said sensing result into the target information in accordance with correspondence between (A) said sensing result and the one of the plurality of sensors that obtained said sensing result and (B) the target information, the correspondence being pre-set as a target information table.

14. A sensor network system comprising: the information processing device as set forth in claim 9; and
the plurality of sensors.

15. An information processing program for causing the information processing device as set forth in claim 9 to operate, wherein:
said program causes a computer to function as the sections.

16. A computer-readable storage medium containing the information processing program as set forth in claim 15.

17. An information processing method in a sensor network system including a plurality of sensors and a information processing device collecting data of sensing results obtained by the plurality of sensors, the information processing method comprising the steps of:
(i) receiving an information request signal indicating target information which is information requested from the information processing device;
(ii) dividing the target information signal into a combination of information elements which appropriately compose the target information in accordance with correspondence between the target information and the combination of information elements, each of the information elements being acquirable from one of the sensing results of the sensors, the correspondence being pre-set as a target information/information element conversion table, said step (ii) being carried out by an information converting section of the information processing device;
(iii) recognizing resource specification information corresponding to the respective information elements converted by the information converting section in accordance with a resource specification information table indicating correspondence between the respective information elements and the resource specification information which specifies resources that can be information sources of the respective information elements, wherein the resource specification information table includes (a) data processing information which indicates a process required in processing data obtained from a resource and (b) communication information which indicates a communication for accessing the resource, the data processing information and the communication information being added to the resource specification information, said step (iii) being carried out by a resource specification information recognizing section;
(iv) acquiring data of sensing results obtained by one or more of the plurality of sensors that are selected in accordance with the resource specification information by using the communication information, said step (iv) being carried out by a data acquiring section of the information processing device;
(v) processing the data acquired by the data acquiring section in accordance with the data processing information; and
(vi) outputting information based on the data processed by said data processing section, said step (vi) being carried out by an output section of the information processing device.

18. An information processing method in a sensor network system including a plurality of sensors and an information processing device collecting data of sensing results obtained by the plurality of sensors, the information processing method comprising the steps of:
(i) receiving data of a sensing result obtained by one of the plurality of sensors;
(ii) converting the data of said sensing result obtained by the one of the plurality of sensors into target information which is preliminarily associated with said sensing result as required information in response to said sensing result, said step (ii) being carried out by a sensing result converting section of the information processing device;
(iii) dividing the target information into a combination of information elements which appropriately compose the target information in accordance with the correspondence between the target information and the combination of information elements, each of the information elements being acquirable from one of the sensing results sensors, the correspondence being pre-set as a target information/information element conversion table, said step (iii) being carried out by an information converting section of the information processing device;
(iv) recognizing resource specification information corresponding to the respective information elements converted by the information converting section in accordance with a resource specification information table indicating correspondence between the respective information elements and the resource specification information which specifies resources that can be information sources of the respective information elements, wherein the resource specification information table includes (a) data processing information which indicates a process required in processing data obtained from a resource and (b) communication information which indicates a communication for accessing the resource, the data processing information and the communication information being added to the resource specification information, said step (iv) being carried out by a resource specification information recognizing section;

(v) acquiring data of the information elements in accordance with the resource specification information by using the communication information, said step (v) being carried out by a data acquiring section of the information processing device;

(vi) processing the data acquired by the data acquiring section in accordance with the data processing information; and (vii) outputting information based on the data processed by said data processing section, said step (vii) being carried out by an output section of the information processing device.

* * * * *